Figure 1:
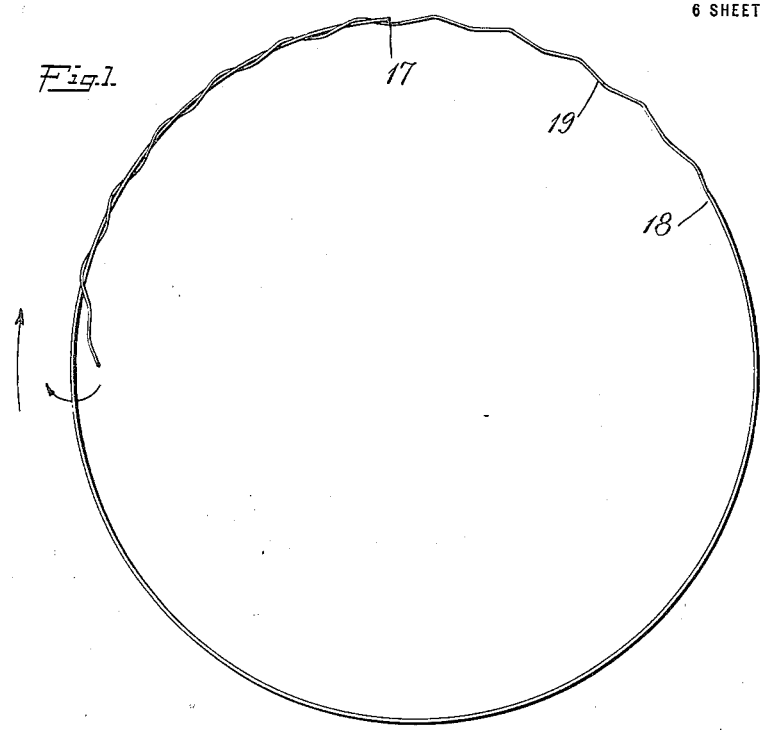

A. C. PRATT.
APPARATUS FOR MAKING GROMETS.
APPLICATION FILED DEC. 10, 1917.

1,294,160.

Patented Feb. 11, 1919.
6 SHEETS—SHEET 1.

INVENTOR
A. C. Pratt,
BY
ATTORNEYS.

A. C. PRATT.
APPARATUS FOR MAKING GROMETS.
APPLICATION FILED DEC. 10, 1917.
1,294,160.
Patented Feb. 11, 1919.
6 SHEETS—SHEET 2.
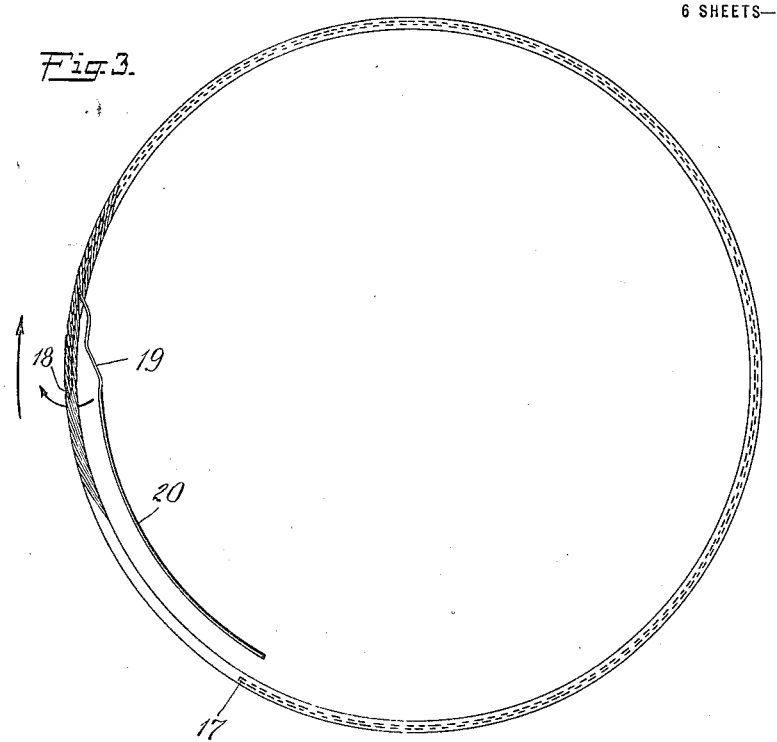
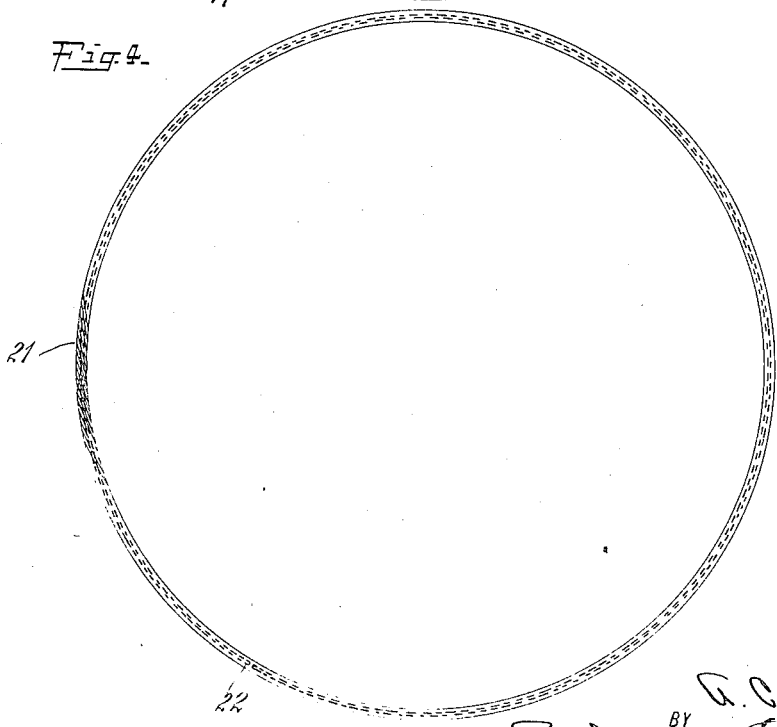
INVENTOR
A. C. Pratt,
BY
ATTORNEYS.

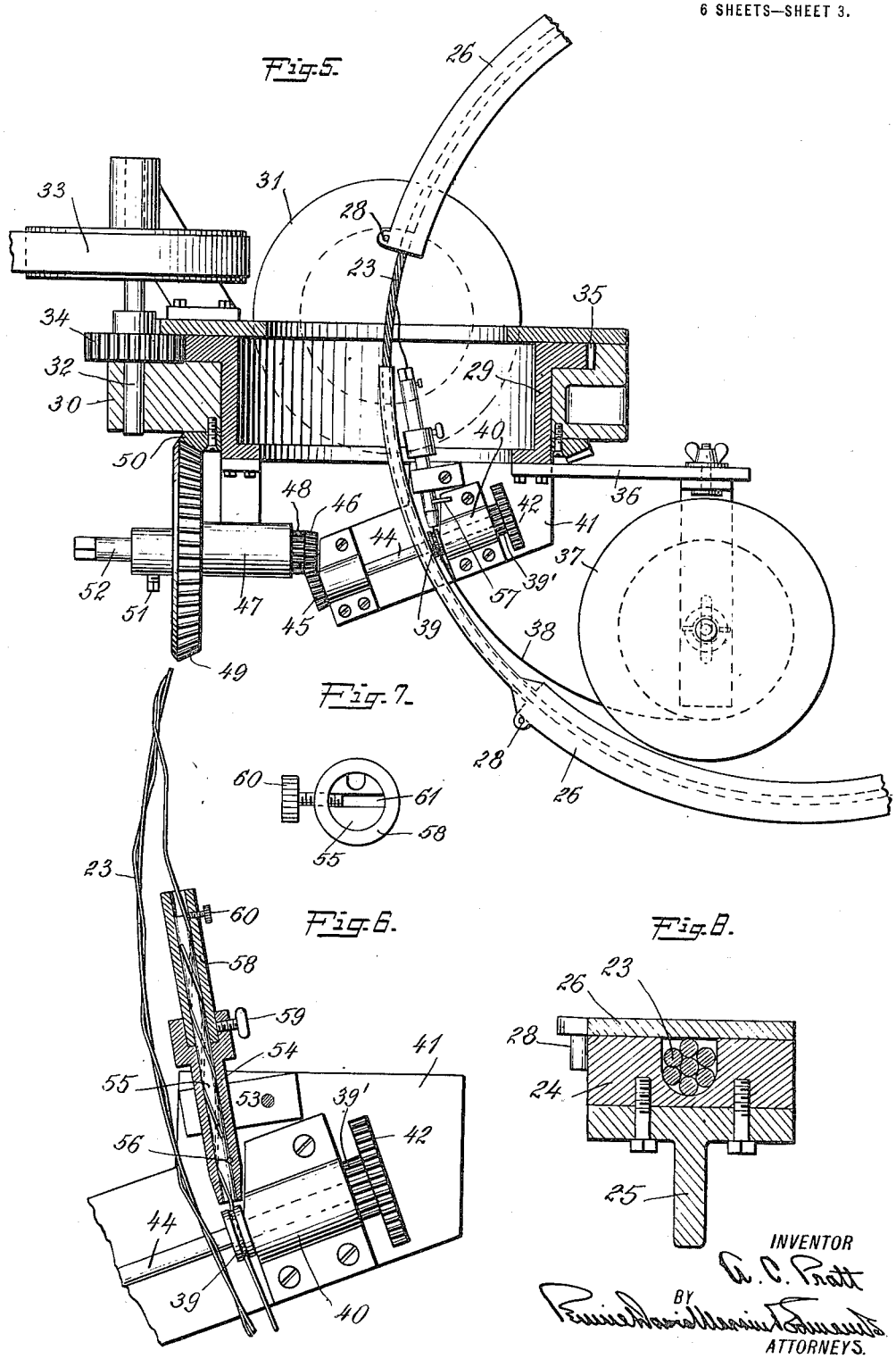

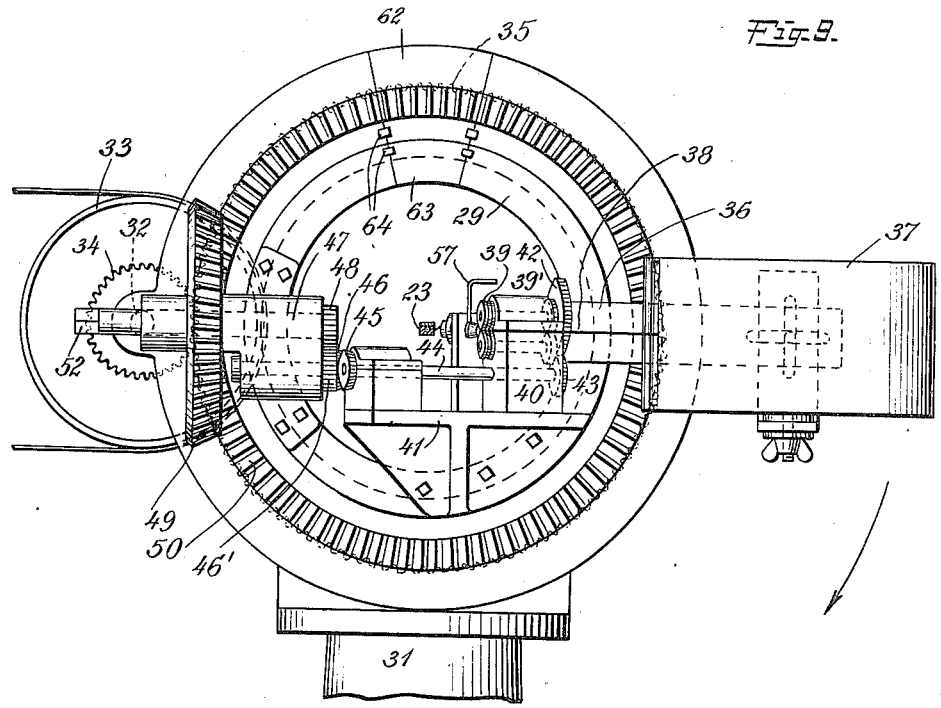
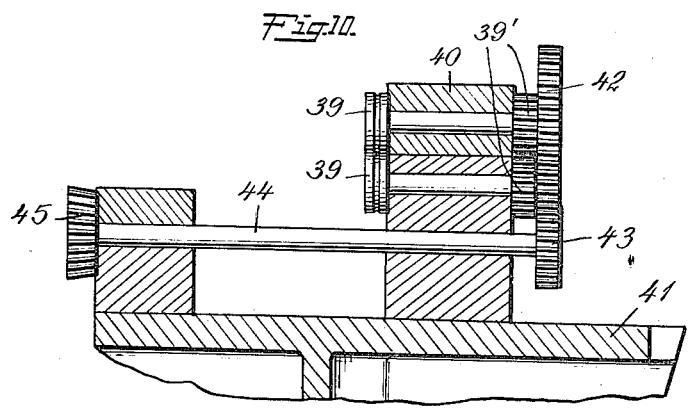

A. C. PRATT.
APPARATUS FOR MAKING GROMETS.
APPLICATION FILED DEC. 10, 1917.
1,294,160.
Patented Feb. 11, 1919.
6 SHEETS—SHEET 5.
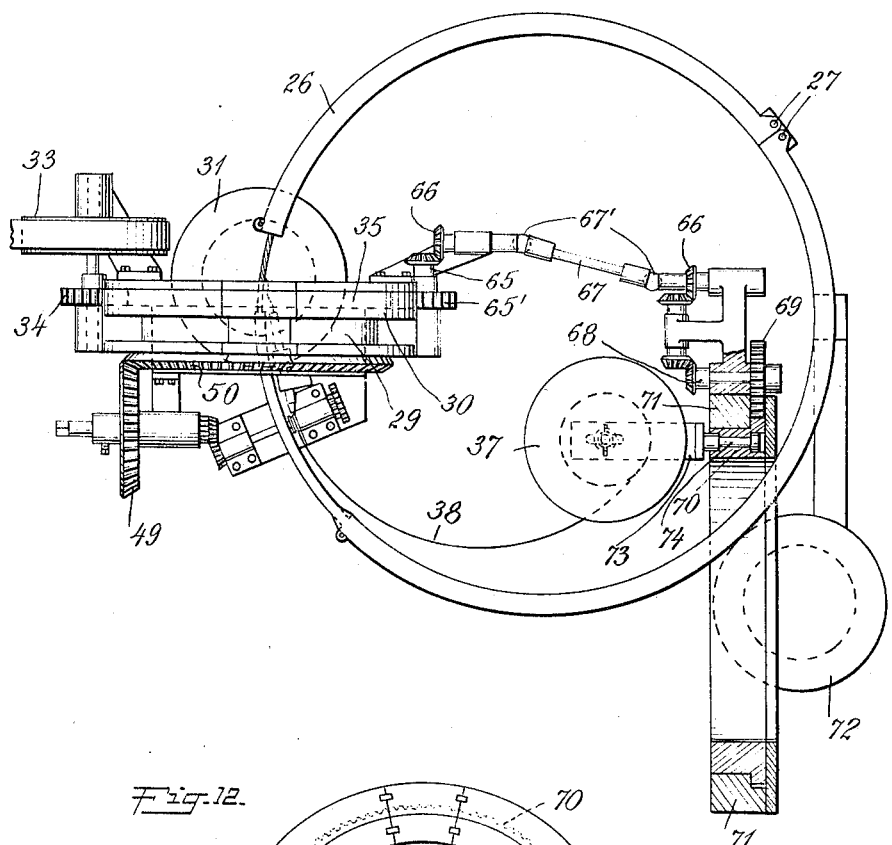
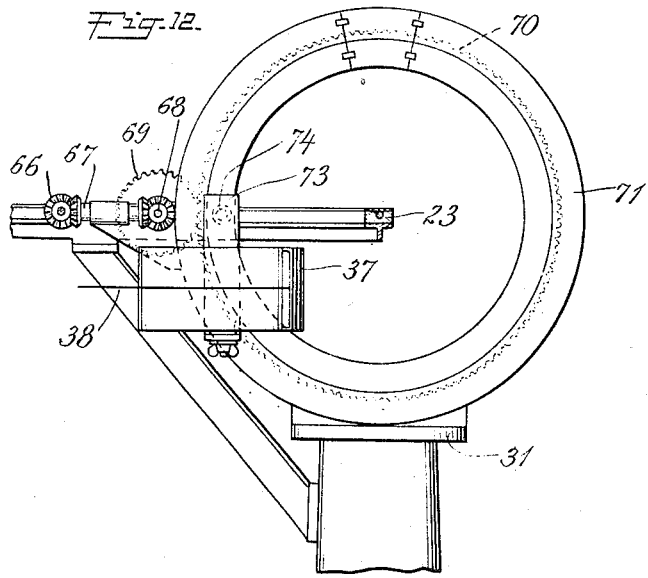
INVENTOR
A. C. Pratt,
BY
ATTORNEYS.

A. C. PRATT.
APPARATUS FOR MAKING GROMETS.
APPLICATION FILED DEC. 10, 1917.
1,294,160.
Patented Feb. 11, 1919.
6 SHEETS—SHEET 6.
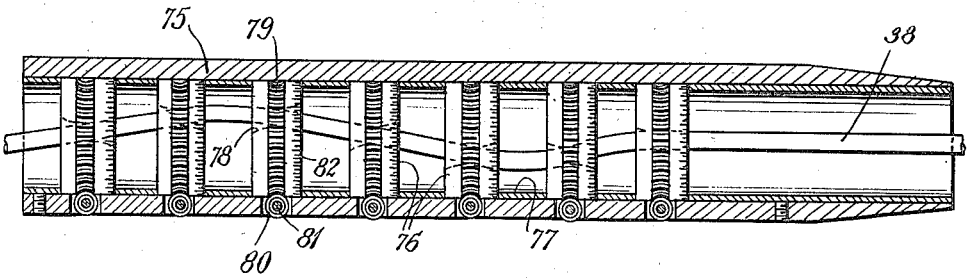
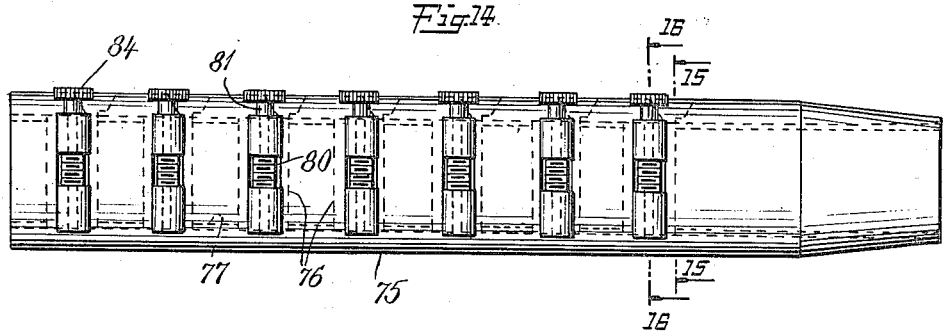
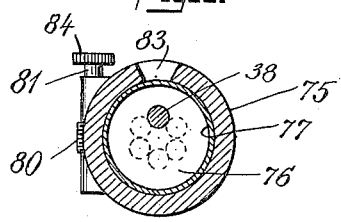 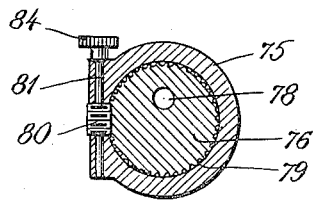
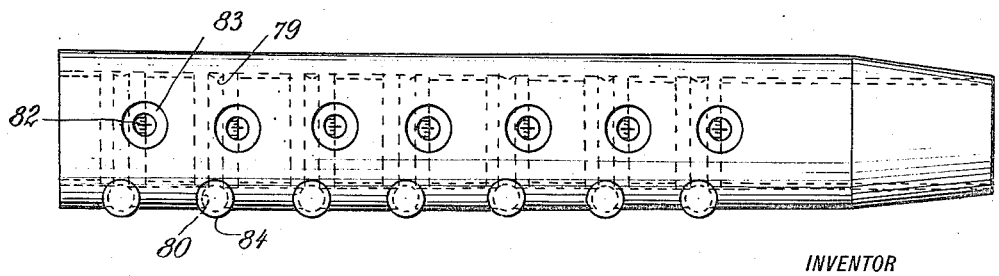
INVENTOR
A. C. Pratt,
BY
ATTORNEYS.

UNITED STATES PATENT OFFICE.

ALPHONSO COMSTOCK PRATT, OF DEEP RIVER, CONNECTICUT.

APPARATUS FOR MAKING GROMETS.

1,294,160.      Specification of Letters Patent.    Patented Feb. 11, 1919.

Application filed December 10, 1917. Serial No. 206,567.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Apparatus for Making Gromets; and I do hereby declare the following to be a full, clear, and exact description of the invention, such as will enable others skilled in the art to which it appertains to make and use the same.

This invention relates to the art of making gromets of the type now commonly used in automobile tires, more particularly tires of the so-called "straight side" type. The manufacture of such gromets as heretofore conducted has been primarily a manual operation requiring the expenditure of considerable time and labor and making the cost of the completed gromets comparatively high. The present invention is directed to the provision of a method of and apparatus for making gromets whereby a material saving in the cost of production is effected without any sacrifice in the strength or other desirable characteristics of the gromets.

Gromets of the type commonly used in the manufacture of automobile tires consist of a plurality of convolutions of a single length of wire, one convolution forming a core and the other convolutions being bent to a spiral formation and wound upon this core. Usually the gromet consists of seven convolutions, a core and six convolutions of spirals thereon, the spirals of the six convolutions lying side by side around the circumference of the gromet.

The procedure heretofore followed in constructing such gromets has been to bend the end portion of a piece of wire to a circle to form a core for a gromet and then wind the wire spirally upon this core, the pitch of the spirals being carefully gaged so as to leave space between the spirals of the first convolution for the spirals of the succeeding convolutions. It is essential that the end of the piece of wire from which the gromet is formed be so inclosed as to prevent it from giving and prevent any separation of the parts of the gromet. To this end it has been common to cut away a portion of the first convolution forming the core after all or substantially all of the convolutions of spirals have been wound upon the core, thus leaving a central space within the gromet over a section thereof; then the portion of the piece of wire from which the gromet is made extending beyond the last convolution of spirals, is cut to such a length as to provide an extension which will just fill this central space made by cutting away the core originally used, and this end of the piece of wire is forced into the central space by temporarily spreading the spirals of the gromet until the core is again completed and the ends of the piece of wire lie within the spirals of the gromet and abut against each other.

It will be noted that in this process the spiraling of the wire is accomplished as an incident to the application of the wire to the gromet. One of the distinctive features of the process and apparatus of the present invention is that the wire for the convolutions of spirals is given its spiral formation independently of and prior to the application of the wire to the gromet. This simplifies the process greatly and permits of the utilization of mechanism of simple construction in the manufacture of the gromets. Also, it permits of the manufacture of gromets without central cores, which gromets may be subsequently pressed to cross-sectional configurations which are desirable. Also, it avoids the necessity for providing complex feeding mechanism for feeding the partially completed gromet about its axis at a predetermined rate of speed so that the spirals will have the desired pitch.

When utilizing the invention in accordance with the preferred practice, the wire for the convolutions of spirals is forced through a die which gives to the spiral formation and "kills" the metal so that the wire retains this formation. Simultaneously with the feeding of the wire through this die, the die is rotated about the center line of the gromet so as to lay the spirals of the wire upon the gromet. The forcing of the wire through the die is sufficient to carry the wire and the partially completed gromet around about its axis so that the provision of a separate feeding mechanism is rendered unnecessary.

The features of the invention will be understood by reference to the following description taken in connection with the accompanying drawings, but I do wish it distinctly understood that the invention is independent of any particular construction of the apparatus for utilizing it as the construction of such apparatus may be varied over a wide range.

In these drawings, Figures 1 to 4 inclusive are views illustrating successive steps in the manufacture of the gromet; Fig. 5 is a plan view partly in horizontal section showing the mechanism for making the gromet; Fig. 6 is a detail view of the feeding and spiraling mechanism shown in Fig. 5 on an enlarged scale; Fig. 7 is a detail view of the end of the die and its support; Fig. 8 is a detail sectional view of the support for the gromet; Fig. 9 is a view in elevation of the mechanism shown in Fig. 1, the gromet and its support being in section; Fig. 10 is a detail view of the mechanism for feeding the wire; Fig. 11 is a view corresponding to Fig. 5 and illustrating a modification of the construction; Fig. 12 is an elevation of a portion of the mechanism shown in Fig. 11, the gromet and its support being in section; Fig. 13 is a horizontal section of a modified form of die; Fig. 14 is an elevation of the construction shown in Fig. 13; Figs. 15 and 16 are transverse sections on lines 15—15 and 16—16 of Fig. 14; and Fig. 17 is a plan view of the construction shown in Fig. 13.

Figure 2:
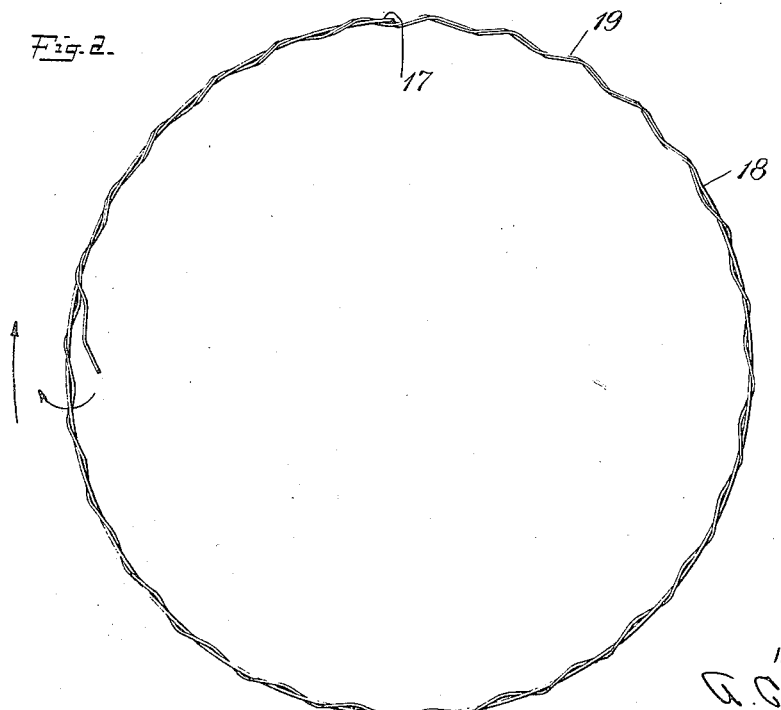

Referring first to Figs. 1 to 4 inclusive, the successive steps in the manufacture of a gromet having a core will be outlined. First, a piece of wire is bent to the arc of a circle to constitute a portion of the complete core. The length of the arc thus formed may be a semi-circle or more as desired, but it must be enough less than a complete circle so that the length of wire added at the end of the operation to complete the core will be long enough to insure that it will be held within the gromet against any possibility of displacement. In Fig. 1, the piece of wire for the core is shown as covering an arc of about 300° starting at 17 and terminating at 18. Beginning at the end of this portion of the piece of wire for the core, the wire is bent to a spiral formation, as is indicated at 19. At the completion of the first convolution, the spirals of this portion of the wire are wound upon the core 17 and the pitch of the spirals is such that the space between successive spirals is just sufficient to receive the spirals of all of the succeeding convolutions. Fig. 2 shows the partially completed gromet after one complete convolution of spirals has been added to the partially completed gromet shown in Fig. 1. Fig. 3 shows the gromet with the seventh convolution in process of application. The spirals indicated at 19 are the last spirals of the sixth complete convolution of spirals so that when these remaining spirals 19 are added to the gromet, the latter consists of six complete convolutions of spirals arranged concentrically around a central core, which core is complete except over the space between the references 17 and 18 of Fig. 1. Beyond the spirals 19 the piece of wire from which the gromet is formed is extended a distance equal to this space, 17 to 18, the wire being cut at such a point as will provide an extension 20 of just sufficient length to fill the space from the point 18 where the spirals of the first convolution begin, to the end of the core at 17. This end of the piece of wire is then positioned upon the gromet manually by laying the spirals 19 in place and then forcing the extension 20 into the central space within the gromet a section at a time by spreading the spirals of the gromet sufficient to permit the entry of the piece 20. Fig. 4 shows the completed gromet, the spirals being indicated at 21, and the joint where the ends of the two pieces constituting the core meet being indicated at 22.

In the manufacture of such a gromet by hand, the first operation is to make the core and this core must be a complete circle because the spirals of the succeeding convolutions are wound upon the core, the wire being bent as a result of its forcible application to the core. Therefore, when the convolutions of spirals have been completed, it is necessary to cut away a piece of the core originally formed to provide a central space over an arc of the gromet into which the end of the wire from which the gromet is formed, such as the piece designated 20 in Fig. 3, can be inserted. One of the distinctive features of the process and apparatus of the present invention is that the convolutions of spirals are given the spiral formation prior to their application to the gromet and not as an incident thereto. This makes the presence of a supporting core for the spirals unnecessary. For instance, in Fig. 1, the portion of the wire indicated at 19 is spirally formed but it is not supported by a core.

Referring now to Figs. 5 to 10, an apparatus for making gromets as above set forth will be described. The partially completed gromet is indicated in Figs. 5, 6, 8 and 9 at 23. It is received within a trough curved to the circle of the gromet and formed in an annulus 24 mounted upon a support 25. A cover 26 may be provided for the groove or trough in the annulus 24 in which the gromet is received. For convenience, in removing the gromet quickly, this cover 26 may be formed in two parts which are pivoted to turn about vertical axes 27 (Fig. 11), the inward movement of these pivoted coverplates being limited by stop pins 28. The gromet thus supported extends through a ring 29 which is mounted for rotation within a stationary ring 30 supported on a base 31. The stationary ring 30 carries a bearing for a shaft 32, driven in any suitable manner, as by a belt 33. On this shaft 32 is a pinion 34 meshing with a gear 35 on the ring 29.

Secured to the rotatable ring 29 is a support 36 for the reel 37 from which the wire 38 for the gromet is supplied. This wire passes between a pair of feed rollers 39 mounted one above the other and each having a circumferential groove therein to receive the wire. The shafts of these feed rollers extend through bearings in blocks or supports 40 mounted upon a shelf 41 which is secured to the rotatable ring 29. The shafts of the two feed rollers 39 have intermeshing gears 39' of the same size secured thereon and one of these shafts carries the gear 42 meshing with a pinion 43 on a shaft 44 rotatable in bearings carried by the shelf 41 and having a bevel gear 45 secured to its end. This bevel gear 45 meshes with a second bevel gear 46 on a shaft which is journaled for rotation within a bearing block 47, which, like the shelf 41, is secured to the rotatable ring 29. The shaft of the bevel gear 46 carries a pinion 46' which meshes with a similar pinion 48 on a second shaft 52 journaled in the block 47. This shaft 52 carries a bevel gear 49 which meshes with a stationary bevel gear 50 secured to the face of the stationary ring 30. The bevel gear 49 has a hub through which a set screw 51 extends so that the gear 49 may be disconnected from its shaft when desired and the end of the shaft is squared to receive a tool whereby the shaft may be turned without turning gear 49.

The operation of these parts of the mechanism is as follows: Rotation of the power shaft 32 operates through the gears 34 and 35 to rotate the ring 29 and all of the parts carried thereby. As these parts rotate, the gear 49 is rotated on its axis by meshing with the stationary gear 50 and its rotation causes rotation of shaft 52, gears 48, 46', 46, 45, 44, 43, 42, and 39', thereby driving the feed rollers 39. The rotation of these feed rollers draws off wire 38 from the reel 37 and feeds it between them at a rate proportioned to the speed of rotation of ring 29. This entire feeding mechanism including the supply of wire fed forward by the feed rolls is rotated about the portion of the gromet 23 extending through the ring 29.

The shelf 41, in addition to the feed rollers, carries the die whereby the wire fed by the feed rollers is given its spiral formation. On the shelf 41 is a support 53 in which a sleeve 54 is secured. This sleeve is adapted to receive one end of a die-rod 55 having a spiral groove cut in the surface thereof, as is indicated in Fig. 6. The rod 55 also has a transverse groove cut in it near one end, as indicated at 56, adapted to aline with a transverse opening in the sleeve 54 so that a pin may be inserted through the transverse opening in the sleeve and the transverse groove in the die, as shown at 57 in Fig. 5, to hold the die rigidly against movement relatively to the sleeve 54. The end of the sleeve 54 is enlarged to form a socket within which the end of a second sleeve 58 is received. This sleeve 58 incloses about one-half of the die-rod 55 extending beyond the end of sleeve 54. The two sleeves may be locked rigidly together by a hand screw 59 and the outer end of the die-rod may be locked to the outer end of the sleeve 58 by a screw 60. The end of this screw 60 is adapted to enter a transverse groove 61 in the end of the die-rod 55, as shown in Fig. 7, to prevent relative rotation of these ends of the sleeve and die-rod.

In using this mechanism for the manufacture of gromets in accordance with the procedure outlined in connection with Figs. 1 to 4, the sleeve 58 is removed after loosening the screw 59, the die-rod 55 is removed after withdrawing the pin 57, and the gear 49 is loosened on its shaft 52 by loosening the set screw 51. A suitable tool is then applied to the end of shaft 52 and that shaft is turned to operate the feed rolls 39 without turning the rotatory ring 29. The end of the piece of wire fed out by the feed rolls during this operation is passed through the sleeve 54 and also through the sleeve 58. The feed rolls are operated by hand in this manner until a length of wire has been fed out sufficient to form the initial portion of the core, that is, a piece of the length indicated by the piece 17—18 on Fig. 1. This piece of wire is fed into and passes around within the groove in the support 24. When an amount of wire has been fed out sufficient for this initial portion of the core, the portion of the wire immediately beyond the sleeve 53 is laid in the spiral groove in the surface of the die-rod 55 by hand. When this has been done, the end of the die-rod with the wire in its groove is inserted in the sleeve 54 and is locked therein by means of the pin 57. The sleeve 58 is then moved back over the outer end of the die-rod 55 with the wire laid in its groove, the end of this sleeve being inserted within the socket in the sleeve 54 and locked therein by the screw 59. The end of the die-rod is locked to the end of the sleeve 58 by the screw 60. The gear 49 is then locked to its shaft 52 by tightening the screw 51. The mechanism is then started in operation by rotating the power shaft 32. This causes rotation of the ring 29 and all of the parts carried thereby, including the supply reel 37, the feed rolls 39, and the die 55, and as these parts rotate the feeding mechanism is driven by the coaction of the gear 49 carried by ring 29 with the stationary gear 50. The rotation of the feed rollers 39 forces the wire 38 between them and into and through the spiral groove in the die-rod 55 so that when the wire emerges from the spiral groove in the die-rod it has a spiral formation, as is indicated in Figs. 5 and 6. The bending of the wire to its spiral formation which takes place within the die, is such as to "kill" the metal of the wire, and therefore the wire holds the spiral formation imparted to it by the groove in the die-rod. As the wire passes out of the die it forces all of the wire ahead of it around in the groove in the support 24, no special feeding means for the operation of the wire lying within the groove being necessary. As the first convolution is completed, the end 17 of the wire moves along the path indicated in Fig. 6 adjacent to the die, and the subsequent operation of the machine including the spiraling of the wire by feeding it forcibly through the die and the rotation of the die about the center line of the gromet results in laying the spirals of the wire upon the core in the manner indicated in Figs. 1, 2 and 6. Operation in this manner is continued until six complete convolutions of spirals are applied to the partially complete core, whereupon the mechanism is stopped, the die-rod 55 is removed and the gear 49 is loosened. The feeding mechanism is then operated by a tool applied to the end of shaft 52 to feed out a section of wire free from spirals sufficient to complete the core. The wire is then cut and this end of the piece is inserted within the central space to complete the core of the gromet.

The pitch of the spiral in the die-rod 55 determines the pitch of the spirals of the gromet. By the employment of the construction illustrated in Fig. 6, this pitch may be readily regulated as desired within substantial limits. The length of the die-rod is such that the rod may be subjected to a substantial degree of torsional movement. With the ends of the die-rod locked, one to the sleeve 54 and the other to the sleeve 58, by means of the pins 57 and 60, the turning of the sleeve 58 relatively to the sleeve 54 subjects the die-rod to torsion and thereby varies the pitch of the spiral groove in the die-rod. To facilitate this, the end of the sleeve 58 may be squared, as indicated in Fig. 5, to receive a wrench. When the desired position of the sleeve 58 and therefore the desired pitch of the spiral groove have been obtained, the two sleeves 58 and 54 may be locked rigidly together by tightening the screw 59.

The operation of the mechanism has been above described in connection with the manufacture of a gromet having a central core, as is indicated in the sectional view of Fig. 8. The presence of the core, however, is in no way essential to the operation as the wire is given its spiral formation before it is added to the gromet instead of in the act of adding it to the gromet, as has been the prior practice. In making a gromet without a core there would be no preliminary period of operation during which the die-rod was removed but instead the die would be used throughout the operation. The spirals of each convolution would be laid beside those of the convolutions previously made until the manufacture of the gromet was completed by the assemblage of six convolutions of spirals arranged concentrically about a central space. The wire would be cut at the end of the sixth convolution and when this end was applied to the gromet in its appropriate position, it would abut the end of the first convolution. These two ends could be welded together, thus making the piece of wire from which the gromet was formed endless.

In order to permit of the removal of the completed gromet it is necessary that provision be made for effecting an opening in the rotatable ring 29 and the stationary ring 30. This is effected in the manner indicated in Fig. 9, wherein segments of these two rings 62 and 63 are shown as made removable by a movement parallel to the axis of the rings. Each of these removable segments is provided with keys or flanges 64 at its sides fitting into key-ways or grooves in the adjacent walls of the rings.

In the construction shown in Figs. 5 and 9, the supply reel 37 rotates with the feeding mechanism and the die mechanism about the axis of the ring 29, with which the gromet substantially coincides where it passes through the ring. The reel 37 can turn on its own axis but it cannot turn on an axis transverse thereto. Therefore, the reel is turned over as it is carried around with the ring 29. Since there is no rotation of the gromet about its center line, this turning over of the reel 37 incident to its rotation about the axis of the ring 29 would result in twisting the wire 38. However, with the mechanism above described, this twist in the wire becomes of no consequence because its effect is completely obliterated by the killing of the wire incident to its passage through the spiral groove. In some instances it is desirable to use in the manufacture of a gromet a material different from the wire above referred to with which this twist in the wire would become highly objectionable, such, for instance, as in making a gromet from a woven material or a wire having a woven covering.

Figs. 11 and 12 show a construction differing from that above described with respect to the mounting and operation of the supply reel, whereby the operation of the mechanism is not accompanied by any twist in the wire. In the construction of Figs. 11 and 12, the feeding and spiraling mechanism is the same as that above described except that the supply reel is not mounted upon the rotatable ring 29. The stationary ring 30 carries a bearing for a shaft 65 carrying a gear 65' which meshes with the gear 35. Shaft 65 is connected by bevel gears 66, shafts 67 and universal joints 67' to a shaft 68 carrying a gear 69 which meshes with gear teeth on a rotatable ring 70 mounted within a stationary ring 71 carried by a support 72. The reel 37 is mounted upon a support 73 carried by a short shaft 74 which is mounted in a bearing in the rotatable ring 70.

The gearing between the rotatable ring 29 and the rotatable ring 70 is such that these two rings are rotated in unison throughout the operation of the machine. But when the machine is operating, the reel 37 of Fig. 11, does not turn over as the reel of the Fig. 5 construction does, but instead, throughout the rotation of wheel 70 carrying the reel 37 with it, the reel and its support 73 turn about the axis of the shaft 74 so that the reel 37 lies in parallel planes at all times. Therefore, all twisting of the length of wire extending from the reel to the feeding mechanism and the die is avoided.

Figs. 13 and 17 show an alternative construction of the die and the die-support. It will be noted that the construction illustrated in Figs. 5 and 6 and above described requires that the die 55 be taken out while feeding forward the lengths of wire which make up the core and when reinserting the die-rod the wire has to be wound by hand in the spiral groove of the die. Furthermore, with the construction of Figs. 5 and 6, regulation of the pitch of the spirals is effected by torsional movement of the die-rod, which is limited as to range and requires the exercise of considerable care. Figs. 13 to 17 inclusive illustrate a construction whereby removal of the die is unnecessary in order to feed out a straight length of wire, whereby adjustment of the pitch of the spirals may be effected over a wide range, and whereby the desired adjustment can be accurately obtained. In these figures, 75 indicates a sleeve corresponding to the sleeve 54 of Fig. 6 constituting the holder for the die. In this instance, the die consists of a plurality of disks 76 located within the sleeve 75, each rotatable and each spaced from the adjacent disks by tubular spacers 77. Each disk has an opening therethrough as indicated at 78, the openings in all of the disks being offset from the center by the same amounts. The several disks 76 are located within the sleeve 75 so that the openings 78 through the disks are displaced successively about the axis of the holder and disks so that the several openings together constitute a die of spiral formation, as is indicated in Fig. 13. To facilitate positioning the disks 76, each disk has worm teeth 79 thereon meshing with a worm 80 carried by a short shaft 81, which is rotatable in bearings in the holder 75. Also, each disk has scale markings thereon as indicated at 82, and the holder 75 has openings 83 therein, one leading to the scale 82 of each disk.

In the use of the machine with a die constructed as indicated in Figs. 13 to 17, the several disks 76 are turned by turning the hand nuts 84 on the shafts 81 so as to bring all of the openings 78 into alinement. The machine is then operated to feed the requisite length of wire forward and as the openings 78 are in alinement, this piece of wire is not bent. After the requisite length of straight wire has been fed forward, the screws 84 are turned so as to advance the several disks 76 as required to bring the openings 78 therein into spiral relation. The machine is then started in operation again and as the wire is fed forward it is given a spiral formation by the die consisting of the several disks 76, the process of making the gromet being otherwise the same as above described.

Throughout the foregoing description and in the appended claims, the term "wire" is used broadly as indicating a strand of any character which may be found desirable to use in the manufacture of the gromet. It may be a single strand, as illustrated in in the drawings, or a composite one made of a multiplicity of strands intertwined in any suitable manner or it may include strands made up in whole or in part of non-metallic substances.

I claim:

1. The method of making a gromet which comprises bending a piece of wire about an axis to form a plurality of adjacent convolutions of a continuous piece of wire and giving the wire for the several convolutions a spiral formation prior to applying it to the partially completed gromet; substantially as described.

2. The method of making a gromet which comprises bending a piece of wire about an axis to form a plurality of adjacent convolutions of a continuous piece of wire, giving the wire for the several convolutions a spiral formation prior to applying it to the partially completed gromet, and laying the spiraled wire of each convolution upon the preceding convolutions of the partially completed gromet so as to cause the spirals of the several convolutions to lie side by side upon the surface of the gromet; substantially as described.

3. The method of making a gromet comprising giving a piece of wire a spiral formation and bending the wire about an axis to form a plurality of adjacent convolutions of a continuous piece of spiraled wire having the spirals of the several convolutions lying side by side upon the surface of the gromet, which method is characterized by giving the wire for the several convolutions the spiral formation in advance of applying it to the partially completed gromet; substantially as described.

4. The method of making a gromet, which comprises bending a portion of a piece of wire to a curve to form a core, giving to the portion of the wire adjacent to the core a spiral formation, and applying the spiraled wire to the core after it has been given the spiral formation; substantially as described.

5. The method of making a gromet which comprises forming a core curved to the arc of a circle by bending a portion of a piece of wire to a curve, giving to the portion of the wire adjacent to the core a spiral formation, applying the spiraled wire after it has been given the spiral formation to the space between the ends of the core and to the core to provide a plurality of convolutions of the spiraled wire on the circle of the core, and then completing the core with a portion of the piece of wire beyond that having the spiral formation by inserting said portion within the spirals of said convolutions; substantially as described.

6. The method of making a gromet which includes forcing a wire through a die which is shaped to give the wire a spiral formation and simultaneously rotating the die about the center line of the gromet being made so as to lay the spirals of the wire upon the gromet; substantially as described.

7. The method of making a gromet which comprises bending a portion of a piece of wire to a curve to form a core, and forcing the portion of the wire adjacent to the core through a die which is shaped to give the wire a spiral formation and simultaneously rotating the die about the center line of the gromet being made so as to lay the spirals of the wire upon the gromet; substantially as described.

8. The method of making a gromet which comprises forming a core curved to the arc of a circle by bending a portion of a piece of wire to a curve, forcing the portion of the wire adjacent to the curve through a die which is shaped to give the wire a spiral formation and simultaneously rotating the die about the center line of the gromet being made so as to apply the spiraled wire to the space between the ends of the core and to the core to provide a plurality of convolutions of the spiraled wire on the circle of the core, and then completing the core with a portion of the piece of wire beyond that having the spiral formation by inserting said portion within the spirals of said convolutions; substantially as described.

9. The method of making a gromet which includes forcing a wire through a die which is shaped to give the wire a spiral formation, thereby feeding the partially completed gromet circumferentially about its axis, and simultaneously rotating the die about the center line of the gromet being made so as to lay the spirals of the wire upon the gromet; substantially as described.

10. A machine for making gromets comprising the combination of a support upon which the gromet is sustained, a die for giving a wire a spiral formation, means for forcing wire through the die, and means for rotating the die about the gromet on said support; substantially as described.

11. A machine for making gromets comprising the combination of a support upon which the gromet is sustained, a die for giving a wire a spiral formation, means for forcing wire through the die and thereby moving the gromet around on the support, a rotatable member supporting the die, and means for rotating said member in correspondence with the feed of the wire through the die; substantially as described.

12. A machine for making gromets comprising the combination of a support upon which the gromet is sustained, a die for giving a wire a spiral formation, means for rotating the die about the gromet on said support, and means for forcing wire through the die and also means for feeding wire without passing it through the die to form a core upon which wire subsequently fed through the die is laid; substantially as described.

13. A machine for making gromets comprising the combination of a support upon which the gromet is sustained, a die-rod having a spiral groove cut in the surface thereof, means for forcing wire through the groove in the die-rod, and means for rotating the die-rod about the gromet on said support; substantially as described.

14. A machine for making gromets comprising the combination of a support upon which the gromet is sustained, a die-rod having a spiral groove cut in the surface thereof, a tubular member within which the die-rod is mounted, means for forcing wire through the groove in the die-rod, and means for rotating the die-rod about the center line of the gromet on said support; substantially as described.

15. A machine for making gromets comprising the combination of a support upon which the gromet is sustained, means for giving a wire a spiral formation, means for effecting a regulation of the pitch of the spirals thus formed, and means for rotating the spiral-forming means about the gromet on said support; substantially as described.

16. A machine for making gromets comprising the combination of a support upon which the gromet is sustained, a die for giving a wire a spiral formation, means for forcing the wire through the die, means for adjusting the die to vary the pitch of the spirals thus formed, and means for rotating the die about the gromet on said support; substantially as described.

17. A machine for making gromets comprising the combination of a support upon which the gromet is sustained, a die-rod having a spiral groove, means for subjecting the die-rod to torsional strain to vary the pitch of the spiral groove therein, means for feeding wire through the die, and means for rotating the die about the gromet on said support; substantially as described.

18. A machine for making gromets comprising the combination of a support upon which the gromet is sustained, a die-rod having a spiral groove cut in the surface thereof, a tubular member within which one end of the die-rod is secured, a second tubular member within which the other end of the die-rod is secured, means for securing the two tubular members together in different relations subjecting the die-rod to torsional strain, means for forcing wire through the groove in the die-rod, and means for rotating the die-rod about the gromet on said support; substantially as described.

19. A machine for making gromets comprising the combination of a support upon which the gromet is sustained, a ring through which the gromet on the support extends, said ring having a removable section, means for rotating the ring, and means carried by the ring for giving a wire a spiral formation; substantially as described.

20. A machine for making gromets comprising the combination of a support upon which the gromet is sustained, a ring through which the gromet on the support extends, said ring having a removable section, means for rotating the ring, a die carried by the ring for giving a wire a spiral formation, and means carried by the ring for forcing wire through the die; substantially as described.

21. A machine for making gromets comprising the combination of a support upon which the gromet is sustained, a ring through which the gromet on the support extends, said ring having a removable section, means for rotating the ring, a die-rod removably mounted on the ring and having a spiral groove therein, and means actuated in correspondence with the rotation of the ring for feeding wire into and through the groove in the die-rod; substantially as described.

22. A machine for making gromets comprising the combination of a support upon which the gromet is sustained, a ring through which the gromet on the support extends, said ring having a removable section, means for rotating the ring, a die for giving a wire a spiral formation, feeding devices for feeding wire into the die, and means actuated by the rotation of the ring for actuating the feeding devices; substantially as described.

23. A machine for making gromets comprising the combination of a support upon which the gromet is sustained, a ring through which the gromet on the support extends, said ring having a removable section, means for rotating the ring, means carried by the ring for spiraling a wire and applying it to the gromet passing through the ring, and a supply reel for the wire mounted on the ring; substantially as described.

24. A machine for making gromets comprising the combination of a support upon which the gromet is sustained, a ring through which the gromet on the support extends, said ring having a removable section, means for rotating the ring, means carried by the ring for spiraling a wire and applying it to the gromet passing through the ring, a support pivotally mounted upon the ring, and a reel for the wire carried by said support; substantially as described.

25. A machine for making gromets comprising the combination of a support on which the gromet is sustained, a die for giving a wire a spiral formation, means for feeding wire through the die, means for rotating the die and the feeding means about the gromet on said support, a stationary gear and gearing connecting said stationary gear with said feeding means for actuating the feeding means in correspondence with its rotation; substantially as described.

26. A machine for making gromets comprising the combination of a curved trough to receive a gromet, a die for giving a wire a spiral formation, feeding means for feeding wire to the die, and means for rotating the die and feeding means about a gromet lying in said groove and simultaneously actuating the feeding means whereby the feed of the wire causes the partially formed gromet to move circumferentially in said groove as spirals of the wire are added to the gromet; substantially as described.

27. A machine for making gromets comprising the combination of a support upon which the gromet is sustained, means for feeding wire and giving the wire a spiral formation as it is fed, and means for rotating said means about the gromet on said support; substantially as described.

28. A machine for making gromets comprising the combination of a support upon which the gromet is sustained, means for feeding wire and giving the wire a spiral formation as it is fed, a supply reel for the wire, and means for rotating the said means and the supply reel about the gromet on said support; substantially as described.

29. A machine for making gromets comprising the combination of a support upon which the gromet is sustained, a ring through which the gromet on the support passes, means carried by the ring for feeding wire and giving the wire a spiral formation as it is fed, and means for rotating said means about the gromet on the support, the said ring having a removable section which may be removed to provide space for withdrawing the gromet from within the ring; substantially as described.

In testimony whereof I affix my signature.
ALPHONSO COMSTOCK PRATT.